United States Patent [19]

Persson et al.

[11] Patent Number: 4,824,705
[45] Date of Patent: Apr. 25, 1989

[54] INSULATED PIPE

[75] Inventors: Sture Persson, Skelleftea; Lars Hoel, Ersmark, both of Sweden

[73] Assignee: Skega AB, Ersmark, Sweden

[21] Appl. No.: 899,014

[22] Filed: Aug. 22, 1986

[30] Foreign Application Priority Data

Sep. 4, 1985 [SE] Sweden .............................. 8504115

[51] Int. Cl.⁴ .............................................. F16L 9/14
[52] U.S. Cl. .................................. 428/35.9; 138/140; 138/149; 138/177; 428/462; 428/455; 428/519; 428/217; 428/492; 428/521; 428/36.8
[58] Field of Search ............... 138/140, 145, 149, 177; 285/47; 428/36, 217, 462, 492, 519, 521, 455

[56] References Cited

U.S. PATENT DOCUMENTS 1,668,635  5/1928  Stefani .............................. 138/149
4,219,173  8/1980  Forbes .................................. 285/47
4,590,971  5/1986  Webster et al. ..................... 138/149
4,632,865 12/1986  Tzur ................................. 428/319.1

Primary Examiner—Ellis P. Robinson
Assistant Examiner—James J. Siedleck
Attorney, Agent, or Firm—Cushman, Darby & Cushman

[57] ABSTRACT

Insulated pipe especially but not exclusively intended for subsea pipelines for transport of oil, gas and similar products which pipe comprises a steel pipe as core, a layer of corrosion protection material, a layer of thermally insulating material surrounding this and an external protective layer surrounding the insulating layer. To improve such insulated pipes so that they are capable of resisting occurring stresses even when placed under water at great depths the three layers contain rubber, the lyaer further containing cork up to 30-70% by volume.

9 Claims, 2 Drawing Sheets

INSULATED PIPE

This invention relates to an insulated pipe especially but not exclusively intended for subsea pipelines for transport of oil, gas and similar products, which pipe comprises a steel pipe, a corrosion protection, a thermally insulating layer surrounding this and a protective layer surrounding the insulating layer.

BACKGROUND OF THE INVENTION

Known insulated pipelines for such transports are constructed and formed so that they can be placed below or above ground and have also appeared to be directly unsuitable for use under water at great depths for transport of oil and gas from oil fields at sea. A pipeline that is to be placed under water and at great depths, for example 300–400 m, will be subjected to great hydrostatic pressures that known pipelines do not manage without collapsing and, moreover, it is necessary that subsea pipelines have not only a good heat insulation but also protection against mechanical damage and water penetration in order to prevent corrosion, not the least considering the difficulties in repairing such pipe lines disposed at great depths.

Laying out subsea pipelines also requires another technology than that normally used for pipelines to be placed below or above ground, and this can be carried out from great drums having a diameter of about 18 m on which the pipeline is wound up. Due to this laying technique the insulating and protective layers of the pipeline will also be exposed to great bending stresses which known protective and insulating layers for pipelines of this type often do not manage.

For pipelines intended to be placed on the bottom of the sea an outer protective layer in the form of steel mantles with watertight partitions has been used, but this type of protective layer is not satisfactorily corrosion-resistant and not suitable for coiling on laying-out drums, either.

SUMMARY OF THE INVENTION

It is therefore the object of this invention to provide an insulated pipe meeting the above-mentioned demands made on pipelines to be placed under water at great depths and which, moreover, is jointed in such a way that the joint between two pipes according to the invention does not deviate from the rest of the pipe.

This is achieved in part in that three rubber layers are provided around the pipe, the middle one also containing cork.

BRIEF DESCRIPTION OF THE DRAWINGS

The invention will be described in the following in greater detail with reference to the enclosed drawings, wherein.

Figure 1:
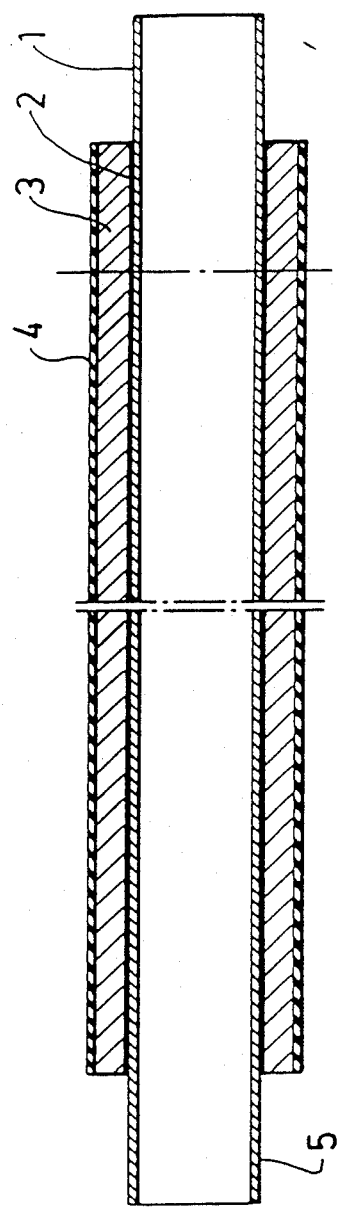
FIG. 1 shows a longitudinal section of a pipe according to the invention and FIG. 2 shows a cross-section thereof on a larger scale.
Figure 2:
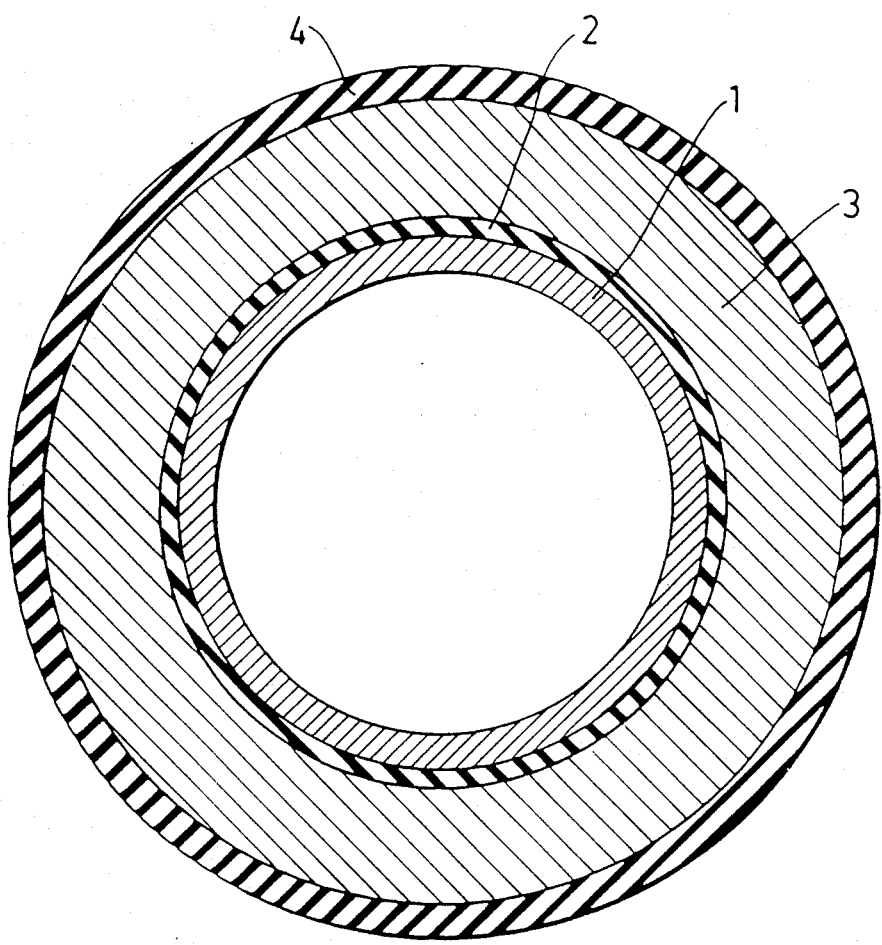

According to the embodiment of the insulated pipe according to the invention shown on the drawings the insulated pipe comprises a steel pipe 1 with a material thickness adapted to occurring pressures. Around the steel pipe there is arranged a protective layer 2 of rubber intimately connected with the steel pipe 1 through vulcanization and which is impervious to water and functions as a corrosion protection for the steel pipe 1.

On the outside of the protective layer 2 there is arranged a layer 3 of thermally insulating material consisting of a mixture of rubber and cork with a % by volume of cork lying between 30 and 70, preferably between 40 and 65. The modulus of elasticity of the rubber material enclosing the cork granules can vary between 1 and 1000 MPa. A break elongation between about 5 and 150% is obtained within this range and the rupture limit is between 2 and 15 MPa and the density between 0.8 and 1.0. The heat conductivity varies as a function of the % by volume of cork and as an example it can be mentioned that the lambda-value is about 0.14 with 50% by volume of cork in the insulating material.

The rubber included in the insulating material is preferably a polychloroprene, but can also be a polydiene.

The insulating layer 3 is surrounded and protected by an outer protective layer 4 consisting of rubber and preferably of the same type of rubber as in the interior protective layer 2, preferably a polychloroprene. In order that this outer protective layer 4 should stand the hydrostatic pressure arising at such great depths as 300–400 m without collapsing and also mechanical stresses it is given a greater hardness than the interior protective layer 2.

The insulating layer 3 is intimately connected with the interior protective layer 2 as well as the outer protective layer with the insulating layer 3, and the connection between the different layers is accomplished by vulcanization. The layers 2, 3 and 4 can be built-up in that strips of material included in the respective layers are wound in turn onto the steel pipe 1 and then vulcanized. When applying the different layers the pipe ends 5 are left free to enable welding of several insulated pipes according to the present invention to a pipeline of a desired length. After welding the steel pipes 1 the interspace or joint between two pipes is built up in the same way as indicated above, i.e. it is provided with an interior protective layer, an insulating layer 3 surrounding this and finally an outer protective layer 4, after which vulcanization takes place, an intimate connection also being obtained longitudinally and no longitudinal or transversal joints being obtained.

Thanks to the fact that the material in the different layers contains rubber the layers become elastic and allow without any great problems bending of the pipeline and also other possibly occurring deformations in the steel pipe for example caused by changes in temperature.

Thus, an insulated pipe very suitable for use under water and at great depths is obtained according to the present invention.

The invention is not restricted to what has been described above and shown on the drawing but can be changed and modified in several different manners within the scope of the appended claims. Thus, the insulating layer can be built in sections with more or less narrow layers of merely rubber, preferably polychloroprene, placed in the very insulating layer 3.

What we claim is:

1. Insulated pipe especially intended for subsea use in pipelines for transport of oil, gas and similar products comprising a steel pipe, a first protective layer surrounding the pipe as corrosion protection, a second layer of thermally insulating material surrounding the first layer and a third external protective layer surrounding the second layer, characterized in that the first and third layers consist of rubber and the second layer consists of rubber and 30–70 percent, by volume, cork.

2. A pipe as in claim 1 wherein the third layer has a hardness greater than that of the first layer.

3. A pipe as in claim 1 wherein the percentage by volume of cork in the second layer is 40-65.

4. A pipe as in claim 1 wherein the rubber in the first and third layers is a polychloroprene while the rubber in the second layer is a polydiene.

5. A pipe as in claim 1 wherein the first, second and third layers are intimately interconnected by vulcanization.

6. A pipe as in claim 1 wherein at least one thick layer of rubber is disposed in the second insulating layer.

7. A pipe as in claim 6 wherein said at least one layer of rubber is a polychloroprene.

8. An insulated pipe assembly comprising: a steel pipe, a first layer consisting of rubber surrounding the pipe, a second layer consisting of rubber containing 30-70% by volume cork surrounding the first layer and a third layer consisting of rubber surrounding the second layer, the layers being coextensive with the length of the pipe and being vulcanized to each other, the first layer being vulcanized to the pipe.

9. An insulated pipe assembly as in claim 8 where the rubber of the first and third layers is polychloroprene and the rubber of the second layer is polydiene.

* * * * *